(12) United States Patent
Kang et al.

(10) Patent No.: US 12,703,366 B2
(45) Date of Patent: Aug. 11, 2026

(54) ROAD SURFACE CONDITION ESTIMATION APPARATUS

(71) Applicants: HYUNDAI MOTOR COMPANY, Seoul (KR); KIA CORPORATION, Seoul (KR); IUCF-HYU (Industry-University Cooperation Foundation Hanyang University), Seoul (KR)

(72) Inventors: Jun Han Kang, Seoul (KR); Ik Jin Um, Busan (KR); Ji Hun Byun, Hwaseong-si (KR); Man Dong Kim, Hwaseong-si (KR); Jung Ho Park, Incheon (KR); Jin Soo Seo, Suwon-si (KR); Chan Uk Yang, Seoul (KR); Seung Won Choi, Seoul (KR); Hyuk Ju Shon, Seoul (KR); Kun Soo Huh, Seoul (KR)

(73) Assignees: HYUNDAI MOTOR COMPANY, Seoul (KR); KIA CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 161 days.

(21) Appl. No.: 18/504,797

(22) Filed: Nov. 8, 2023

(65) Prior Publication Data

US 2024/0416920 A1 Dec. 19, 2024

(30) Foreign Application Priority Data

Jun. 15, 2023 (KR) ........................ 10-2023-0076612

(51) Int. Cl.
*B60W 40/06* (2012.01)

(52) U.S. Cl.
CPC ......... *B60W 40/06* (2013.01); *B60W 2520/10* (2013.01); *B60W 2540/18* (2013.01)

(58) Field of Classification Search
CPC ............. B60W 40/06; B60W 2520/10; B60W 2540/18; B60W 2520/105; B60W 2552/35; B60W 2552/40; B60W 40/068; B60W 40/10; B60W 2510/0638; B60W 2510/0657; B60W 2510/10; B60W 2510/20; B60W 2520/125; B60W 2520/14; B60W 2520/28; B60W 10/00–2900/00; G06N 3/08
USPC .............................................................. 701/1
See application file for complete search history.

(56) References Cited

U.S. PATENT DOCUMENTS 11,390,287 B2 7/2022 Koo et al.
11,526,721 B1 * 12/2022 O'Malley ............... G06F 30/15
11,597,384 B2 * 3/2023 Rodriguez Romero ..................... G06V 20/58
12,179,769 B2 * 12/2024 Lee ..................... B60W 30/182
(Continued)

FOREIGN PATENT DOCUMENTS

KR 20210106807 A 8/2021

*Primary Examiner* — Mohamed Abdo Algehaim
(74) *Attorney, Agent, or Firm* — Lempia Summerfield Katz LLC

(57) ABSTRACT

A road surface condition estimation apparatus includes a storage unit configured to store a road surface condition estimation model, and a road surface severity estimator configured to estimate, based on travel information, severity of a condition of a road surface on which a vehicle is travelling using the road surface condition estimation model.

16 Claims, 5 Drawing Sheets

(56) References Cited

U.S. PATENT DOCUMENTS

| | | | | |
|---|---|---|---|---|
| 2010/0100360 | A1* | 4/2010 | Deng | B60T 8/172 703/2 |
| 2014/0188350 | A1* | 7/2014 | Popham | B60W 50/082 701/49 |
| 2015/0166072 | A1* | 6/2015 | Powers | B60W 40/076 701/1 |
| 2018/0095462 | A1* | 4/2018 | Kim | B60W 10/04 |
| 2018/0148062 | A1* | 5/2018 | Sung | B60W 30/18172 |
| 2018/0321142 | A1* | 11/2018 | Seifert | B60W 40/06 |
| 2019/0294167 | A1* | 9/2019 | Kutila | G08G 1/096827 |
| 2019/0366846 | A1* | 12/2019 | Cao | B60T 8/175 |
| 2020/0124430 | A1* | 4/2020 | Bradlow | B62J 45/412 |
| 2020/0256444 | A1* | 8/2020 | Dumas | B60W 10/16 |
| 2020/0317205 | A1* | 10/2020 | Hayashi | G06V 10/806 |
| 2020/0388154 | A1* | 12/2020 | Kim | H04W 4/44 |
| 2021/0070304 | A1* | 3/2021 | Weldemariam | B60W 40/06 |
| 2021/0080568 | A1* | 3/2021 | Brown | G01S 13/87 |
| 2021/0261134 | A1* | 8/2021 | Koo | B60W 40/10 |
| 2022/0044034 | A1* | 2/2022 | RoyChowdhury | E01C 23/01 |
| 2022/0055659 | A1* | 2/2022 | Zhang | B60W 30/182 |
| 2022/0254169 | A1* | 8/2022 | Yamasaki | G06T 7/11 |
| 2023/0055334 | A1* | 2/2023 | Zhou | B60W 40/06 |
| 2023/0092933 | A1* | 3/2023 | Cooper | G01S 13/931 340/438 |
| 2024/0001931 | A1* | 1/2024 | Kurano | B60W 40/13 |
| 2024/0034290 | A1* | 2/2024 | Subramanian | G08G 1/096791 |
| 2024/0359703 | A1* | 10/2024 | Cooper | G01S 13/931 |

* cited by examiner

ROAD SURFACE CONDITION ESTIMATION APPARATUS

CROSS-REFERENCE TO RELATED APPLICATION(S)

This application claims priority to and the benefit of Korean Patent Application No. 10-2023-0076612, filed on Jun. 15, 2023, the disclosure of which is incorporated herein by reference in its entirety.

BACKGROUND

1. Field

The present disclosure relates to a road surface condition estimation apparatus.

2. Description of Related Art

Interest in travelling off-road has been increasing. As a result, controls have been developed to set a travel mode of a vehicle specialized for travelling off-road. Recently, an apparatus for automatically recognizing a surface of a road on which a vehicle is travelling and applying a corresponding control mode has been developed. For example, a vehicle can automatically recognize a sandy road surface and assists in travelling in a sandy road surface travelling control mode.

When traveling off-road, not only a type of road surface, but also characteristics of each road surface, such as a depth, resistance, and the like of a road surface, may have a significant impact on a vehicle traveling off-road.

Even on the same type of road surface, the possibility of a vehicle getting stuck varies according to the road surface condition. For example, on a relatively hard road surface with little sand accumulated, a vehicle is less likely to be stuck due to a relatively small amount of immersion or slippage of the wheels of the vehicle. The road surface with a low probability of occurrence of a vehicle getting stuck may be referred to as a shallow road surface. Conversely, on a road surface on which a large amount of sand is accumulated and the wheels are easily immersed, a vehicle is more likely to get stuck. The road surface with a high probability of occurrence of a vehicle getting stuck may be referred to as a deep road surface.

In the related art, there are apparatuses for classifying types of road surfaces, but it is difficult to find an apparatus capable of verifying the severity of each road surface.

SUMMARY

An aspect of the present disclosure provides a road surface condition estimation apparatus capable of estimating the severity of a road surface condition.

According to an aspect of the present disclosure, a road surface condition estimation apparatus includes a storage unit configured to store a road surface condition severity estimation model. The road surface estimation model also includes a road surface severity estimator configured to estimate, based on travel information, the severity of a condition of a road surface on which a vehicle is travelling using the road surface condition severity estimation model.

The road surface condition estimation apparatus may further include a receiver configured to acquire the travel information using a network provided in a vehicle.

The travel information may include at least one of engine torque, engine speed, longitudinal acceleration, lateral acceleration, yaw rate, wheel speed, gear state, steering angle, and vehicle speed.

The road surface condition severity estimation model may be trained using a deep learning network.

The road surface condition severity estimation model may include a first deep learning network and a second deep learning network. The first deep learning network and the second deep learning network may be trained based on data on different road surfaces.

One deep learning network, among the first deep learning network and the second deep learning network, may be trained to estimate the severity of a sandy road surface. The other deep learning network may be trained to estimate the severity of a muddy road surface.

The road surface severity estimator may be configured to estimate road surface severity, only when the travel information satisfies a preset estimation start condition.

The estimation start condition may be determined based on at least one of a steering angle, a gear state, and a travel speed of the vehicle.

The estimation start condition may include at least a condition for a steering angle. Road surface severity of a condition of a road surface on which the vehicle is travelling may be estimated when the steering angle is 360 degrees or less.

The estimation start condition may include at least a condition for a gear state. Road surface severity of a condition of a road surface on which the vehicle is travelling may be estimated when the gear state is not a reverse gear.

The estimation start condition includes at least a condition for a travel speed of the vehicle. Road surface severity of a condition of a road surface on which the vehicle is travelling may be estimated when the travel speed of the vehicle is greater than or equal to a preset speed.

The road surface severity estimator may be configured to estimate a result of estimating the road surface severity as a score within a preset range.

The score within the preset range may have a range of 0.0 to 1.0.

The road surface severity estimator may be configured to estimate the road surface as a deep road surface, when the estimated score is greater than a preset first reference score, and estimate the road surface as a shallow road surface, when the estimated score is less than a preset second reference score.

An average of the first reference score and the second reference score may be less than 0.5.

The road surface condition estimation apparatus may further include a post-processor configured to perform post-processing on road surface severity information estimated by the road surface severity estimator.

The post-processor may be configured to perform post-processing using an exponential moving average (EMA).

The post-processor may be configured to apply a first exponential parameter value, when the road surface severity estimator estimates the road surface as a deep road surface. The post-processor may be also configured to apply a second exponential parameter value, when the road surface severity estimator estimates the road surface as a shallow road surface.

The first exponential parameter value may be set to be greater than the second exponential parameter value.

According to embodiments of the present disclosure, severity of a condition of a road surface may be verified.

In addition, severity of a condition of a road surface may be provided as a score, thereby quantitatively providing a value usable for other determinations, such as determining the probability of a vehicle getting stuck and the like.

In addition, a user may be warned of the risk of a vehicle being stuck using a quantified value of road surface severity. The quantified value of road surface severity may be compared to a preset value and used as a reference for switching a travel mode of the vehicle to an optimal travel control mode.

BRIEF DESCRIPTION OF DRAWINGS

The above and other aspects, features, and advantages of the present disclosure should be more clearly understood from the following detailed description, taken in conjunction with the accompanying drawings, in which.

DETAILED DESCRIPTION

Various modifications may be made to the embodiments. The embodiments are not construed as being limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to a second component, and similarly the second component may also be referred to as the first component. The term "and/or" may include combinations of a plurality of related described items or any of a plurality of related described items.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It should be further understood that the terms "comprises" and/or "comprising," when used in this specification, specify the presence of stated features, integers, steps, operations, elements, components or combination thereof, but do not preclude the presence or addition of one or more other features, integers, steps, operations, elements, components, and/or groups thereof.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

When a component, device, element, or the like of the present disclosure is described as having a purpose or performing an operation, function, or the like, the component, device, or element should be considered herein as being "configured to" meet that purpose or to perform that operation or function.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as having an ideal or excessively formal meaning, unless otherwise defined herein.

Hereinafter, with reference to the accompanying drawings, embodiments of the present disclosure are described in more detail.

Figure 1:
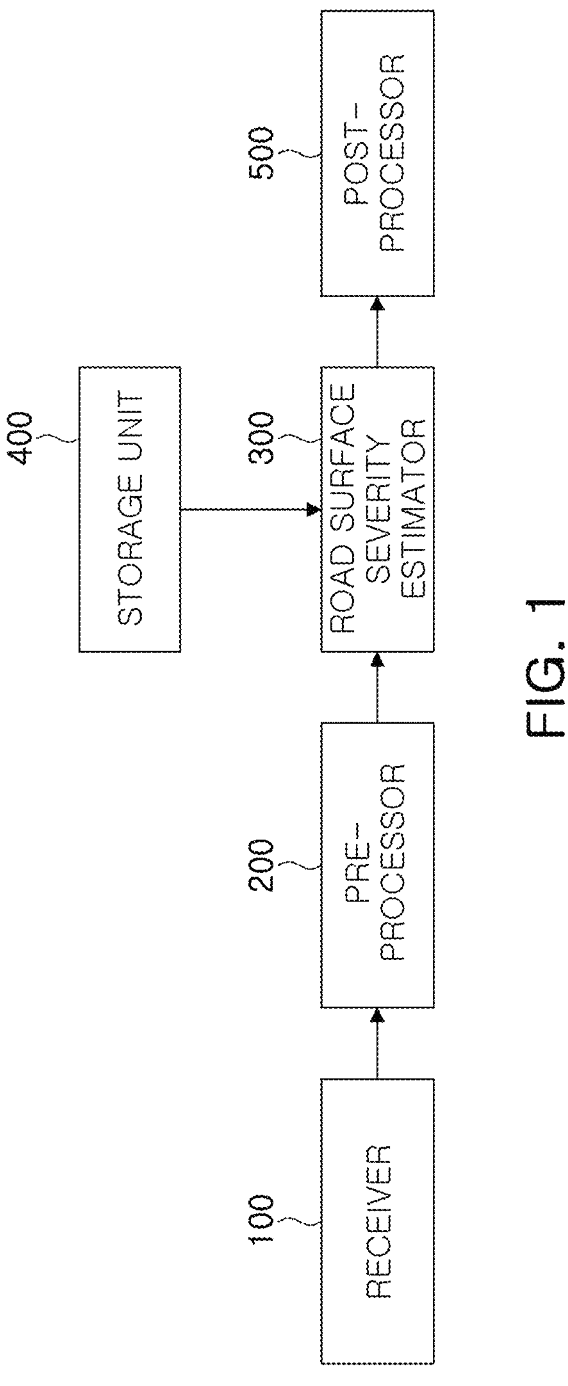
FIG. 1 is a block diagram illustrating a road surface condition estimation apparatus according to an embodiment of the present disclosure.

FIG. 1 is a block diagram illustrating a road surface condition estimation apparatus according to an embodiment of the present disclosure.

The road surface condition estimation apparatus (e.g., road surface condition estimation severity apparatus) may be an apparatus for estimating the severity of a condition of a road surface. The severity of the road surface may be a concept including depth of the road surface, condition information of the road surface, and the like. For example, the severity of the road surface may be estimated in consideration of a road surface with hard sand, a road surface with scattered sand, a road surface with severe curves or irregularities, and the like. In addition, in the case of a muddy road surface, the severity of the road surface may be estimated in consideration of depth at which the wheels of a vehicle are immersed in the mud, the stickiness of the mud, and the like. In the case of mountain mud, the severity of the road surface may be estimated in consideration of a location, a size, and the like of a stone or rock.

Referring to FIG. 1, the road surface condition estimation apparatus according to an embodiment of the present disclosure may include a receiver 100, a pre-processor 200, a storage unit 400, a road surface severity estimator 300, and a post-processor 500.

The receiver 100 may receive travel information on a travel state of a vehicle. For example, the receiver 100 may receive a type of road surface, engine revolutions per minute (RPM), engine torque, longitudinal acceleration, lateral acceleration, yaw rate, wheel speed of each wheel, current gear state information, steering angle, and the like.

The receiver 100 may receive information on the travel state of the vehicle using a network provided in the vehicle. For example, the receiver 100 may receive, using a controller area network (CAN) of the vehicle, travel information such as engine RPM, engine torque, longitudinal acceleration, lateral acceleration, yaw rate, wheel speed of each wheel, current gear state information, and steering angle, among CAN signals of the vehicle.

In addition, the receiver 100 may receive information on the type of road surface. The type of road surface may include: a sandy road surface, a muddy road surface, a snowy road surface, an asphalt road surface, and the like. Determination of the type of road surface may be a non-core component of the present disclosure, and information on the determination of the type of road surface according to the related art may be received through the receiver 100. Characteristics of the travel information according to the severity of the road may vary depending on the type of road surface. Therefore, information on the type of road surface may be received to help a road surface condition severity estimation model (e.g., road surface condition estimation model) learn and accurately estimate the severity of the road surface.

The pre-processor 200 may perform a predetermined conversion to input, to the road surface severity estimator 300 to be described below, input data transmitted through the receiver 100. For example, the pre-processor 200 may pre-process the input data transmitted through the receiver 100 using a standardization method.

Methods for pre-processing, by the pre-processor 200, the input data may include normalization, standardization, and a fast Fourier transform.

Normalization may be a pre-processing method of converting the input data between 0.0 and 1.0. This is achieved by changing a difference between each value and a minimum value in comparison to a difference between a maximum value and a minimum value of the input data. In addition, standardization may be a pre-processing method of converting input data into a normal distribution having a mean of 0.0 and a standard deviation of 1.0. In addition, a fast Fourier transform method may be an algorithm for obtaining an approximate value of a function, and may be an algorithm designed to reduce the number of calculations. In the road surface condition estimation apparatus according to an embodiment of the present disclosure, the pre-processor 200 may apply standardization in consideration of the estimation accuracy and the calculation time. However, the present disclosure is not limited thereto, and various pre-processing methods including normalization and a fast Fourier transform method may be applied to the pre-processor 200.

The storage unit 400 may store a road surface condition severity estimation model 410 including an artificial neural network for which learning has been completed.

The storage unit 400 may be a recording medium suitable for storing the road surface condition estimation model. Examples of recording medium include but are not limited to, magnetic media such as hard disks, floppy disks, and magnetic tapes. Other examples include, optical media such as compact disk read only memory (CD-ROM) and digital video disks (DVDs). Additional examples include, magneto-optical media such as floptical disks, flash memory or an erasable programmable ROM (EPROM), or a semiconductor memory such as an SSD manufactured based thereon.

The road surface severity estimator 300 may estimate the severity of a condition of a road surface on which the vehicle is travelling, using the road surface condition severity estimation model 410 stored in the storage unit 400.

The road surface severity estimator 300 may estimate (e.g., classify) the road surface severity as a score within a preset range, using the road surface condition severity estimation model 410. For example, the road surface severity estimator 300 may estimate, based on the travel information, the road surface severity as a score within a range of 0.0 to 1.0. The road surface severity estimator 300 may estimate a shallow road surface with a non-severe road surface condition and a low probability of getting a vehicle stuck a score closer to zero (0.0). Additionally, the road surface severity estimator 300 may estimate a deep road surface with a severe road surface condition and a high probability of getting a vehicle stuck a score closer to 1.0.

Road surface severity may be expressed using the concept of a depth of the road surface. A road surface with a high probability of a vehicle getting stuck due to a severe road condition may be referred to as a deep road surface. In addition, a road surface having a low probability of a vehicle getting stuck due to a non-severe road surface condition may be referred to as a shallow road surface.

In other words, a deep road surface estimation and a shallow road surface estimation may be based on information pertaining to a condition of a road surface in addition to a depth of the road surface. For example, a condition of a road surface may include a road surface with hard sand, a road surface with scattered sand, a road surface with watery mud, a road surface with sticky mud, a road surface with small pebbles, a road surface with large rocks, and the like.

The road surface severity estimator 300 may estimate a road surface on which the vehicle is travelling as a deep road surface, when an estimated score is greater than a first reference score. Additionally, the road surface severity estimator may estimate the road surface as a shallow road surface, when the estimated score is less than a second reference score. The first reference score may be a reference score for determining that a road surface on which a vehicle is travelling is a deep road surface. The second reference score may be a reference score for determining a road surface on which a vehicle is travelling as a shallow road surface. The first reference score may be greater than or equal to the second reference score.

Differences between the first reference score and the second reference score and a median value within a preset range (e.g., 0.5 when a road surface severity score is estimated to be within a range of 0.0 to 1.0) may be different from each other. The road surface severity score may be set to 0.0 with respect to a road surface having no probability of a vehicle getting stuck. The road surface severity score may be set to 1.0 with respect to a road surface on which a vehicle does get stuck. More specifically, the first reference score may be set to be closer to the median value, as compared to the second reference score. For example, the first reference score may be set to 0.6 and the second reference score to 0.3. In other words, an average of the first reference score and the second reference score may be less than the median value.

In other words, in order to prevent a vehicle from getting stuck, the road surface severity estimator 300 may set the first reference score (0.6) to be close to the median value (0.5), such that a deep road surface may be more stably and accurately measured.

The road surface severity estimator 300 may selectively receive travel information depending on a type of road surface. The road surface severity estimator 300 may also estimate road surface severity travel information that is different for each type of road surface.

For example, when the type of road surface received is a sandy road surface, the road surface severity estimator 300 may estimate road surface severity of the sandy road surface. The road surface severity estimator may estimate the sandy road surface by using engine RPM, engine torque, longitudinal acceleration, lateral acceleration, yaw rate, and wheel speed of each wheel.

In addition, when the type of road surface received is a muddy road surface, the road surface severity estimator 300 may estimate road surface severity of the muddy road surface, longitudinal using acceleration, lateral acceleration, yaw rate, and wheel speed of each wheel. In the case of a muddy road surface, road surface severity may be more accurately estimated through the behavior of a vehicle travelling, rather than the driver's actions.

The road surface severity estimator 300 may be implemented through an algorithm configured to control operations of various components of a vehicle. Alternatively, the road surface estimator 300 may be implemented through a non-volatile memory (not illustrated) configured to store data on software instructions for reproducing the algorithm and a processor (not illustrated) configured to perform an operation described below using data stored in the memory. The memory and the processor may be implemented as individual chips. Alternatively, the memory and the processor may be implemented as a single chip integrated with each other. The processor may be in the form of one or more processors.

The post-processor 500 may post-process data estimated by the road surface severity estimator 300.

The post-processor 500 may use an exponential moving average (EMA). The EMA may be a moving average assigning a greater weight and significance to most recent data. In the EMA, post-processing may be performed by applying an exponential parameter (a) to data estimated by the road surface severity estimator 300. A smaller exponential parameter may assign a greater weight to past data, thereby performing more stable and accurate estimation. Conversely, as a proportion of the past data increases, immediate response to current data may not be performed, and a delay time may occur.

An estimated value to which the EMA is applied may be transmitted back to the road surface severity estimator 300. The road surface severity estimator 300 may estimate the severity of a condition of a road surface using the estimated value to which the EMA is applied.

In addition, when it is difficult to accurately estimate road surface severity, the post-processor 500 may maintain a previous estimated value of road surface severity without using the estimated data of the road surface severity estimator 300.

When it is difficult for the road surface severity estimator 300 to accurately estimate road surface severity, the previous data estimated by the road surface severity estimator 300 may be maintained. For example, in a situation similar to that in which a vehicle is stopped (e.g., when a travel speed of the vehicle is 1.5 kph (kilometer per hour) or less, and an accelerator pedal stroke is 3% or less), the vehicle is turning (e.g., a steering angle is greater than 360 degrees), and the vehicle is reversing (e.g., the vehicle is in reverse gear), the previous data estimated by the road surface severity estimator 300 may be maintained.

Components of the road surface condition estimation apparatus may be connected in a wired or wireless manner to exchange information using a network provided in the vehicle. For example, data may be exchanged using network communication means provided in a vehicle, such as Ethernet, media-oriented systems transport (MOST), Flexray, controller area network (CAN), local: interconnect network (LIN), Internet, LTE, 5G, Wi-Fi, Bluetooth, near field communication (NFC), Zigbee, radio frequency (RF), and the like.

Figure 2:
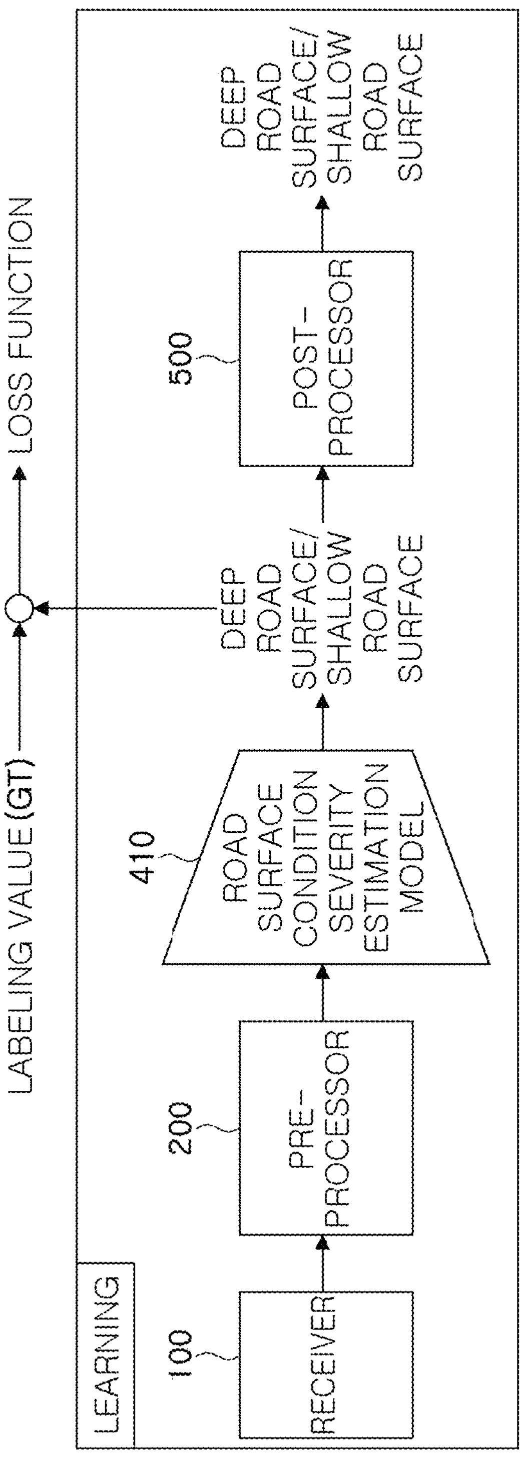
FIG. 2 is a block diagram illustrating learning of a road surface condition estimation model stored in a storage unit according to an embodiment of the present disclosure.

FIG. 2 is a block diagram illustrating learning of a road surface condition severity estimation model 410 stored in a storage unit 400 according to an embodiment of the present disclosure.

The road surface condition severity estimation model 410 may receive travel information of a vehicle through the receiver 100 and pre-process the received travel information. Road surface severity may be estimated based on the pre-processed travel information. The estimated road surface severity may be compared to a labeling ground truth (GT) value and learned. The labeling GT value may be a labeling of road surface severity by a person driving the vehicle on an actual road. In addition, the labeling GT value may be modified later based on a result of the labeling depth of the road while the person is driving the vehicle on the actual road. For example, labeling performed in real time while the vehicle is travelling may be unified for each region later. Even a similar road surface may be labeled as having different road surface severity. In other words, in a selected region, a zone labeled as having a change in road surface severity may be reconfirmed, and then an operation of correcting the zone to have the same road surface severity may be additionally required.

Travel data for deep training the road surface condition severity estimation model 410 may be acquired from various road surfaces in various regions. In addition, road surface data may be acquired, and road surface severity, for example, a deep road surface or a shallow road surface, may be labeled depending on each region. In particular, in the case of a region in which a deep road surface and a shallow road surface are mixed, the deep road surface and the shallow road surface may be labeled while travelling in real time.

Travel data may be acquired at various speeds. In particular, in the case of a shallow road surface, it may be desired to sufficiently acquire not only travel data at high speed but also travel data at low speed. In the case of a deep road surface, it may be difficult to sufficiently acquire travel data at high speed due to the risk of an accident. When a sufficient amount of low-speed travel data is not acquired on a shallow road surface, an issue may arise where the road surface condition severity estimation model 410 is trained to depend on speed to estimate road surface severity.

Travel data used for the training of the road surface condition severity estimation model 410 may be obtained by mixing actual travel data and test travel data at a preset ratio (e.g., 8:2) and learned. The actual travel data may be labeled ground truth travel data, and the test travel data, i.e., arbitrarily generated data, may be data created for training of the road surface condition severity estimation model 410.

The road surface condition severity estimation model 410 may include a plurality of road surface condition severity estimation models 410 trained differently for each type of road surface. For example, a road surface condition severity estimation model 410 for a sandy road surface and a road surface condition severity estimation model 410 for a muddy road surface may be included. In addition, the road surface condition severity estimation model 410 for the sandy road surface may be trained based on travel data of the sandy road surface, and the road surface condition severity estimation model 410 for the muddy road surface may be trained based on travel data of the muddy road surface. The type and number of travel information used to train the road surface condition severity estimation model 410 for the sandy road surface and the muddy road surface may be appropriately selected individually depending on characteristics of a road surface.

In addition, the road surface condition severity estimation model 410 including at least one deep learning network may be trained. The road surface condition severity estimation model 410 may include a convolution neural network (CNN) having one-dimensional (1D) convolution layer and a long-shot term memory (LSTM) network. For example, the road surface condition severity estimation model 410 may include two deep learning networks. Among the two deep learning networks, one deep learning network may estimate the severity of a sandy road surface, and the other deep learning network may estimate the severity of a muddy road surface. The deep learning network for estimating severity of the sandy road surface and the deep learning network for estimating severity of the muddy road surface may respectively include a CNN having a 1D convolution layer and an LSTM network, and may be individually trained.

In the process of training the road surface condition severity estimation model 410, sampling time for an interval of travel information and the number of histories used for prediction may be adjusted. The sampling time may be a time interval of travel information being input, and the number of history may be the number of pieces of travel information used for prediction for each travel information being input. An excessively short amount of sampling time may cause a small difference between travel information values, such that calculation time may be unnecessarily increased, and real-time calculation may be difficult. Conversely, an excessively long amount of sampling time may not reflect a change in travel information, such that accuracy may decrease. In addition, as the number of histories increases, more accurate calculation may be performed, but calculation time may increase.

The road surface condition severity estimation model 410 according to an embodiment of the present disclosure may apply a sampling time of 10 ms (milli-second) to more accurately reflect a change in a deep road surface having a large change in travel information. In addition, the road surface condition severity estimation model 410 according to an embodiment of the present disclosure may apply thirty histories in consideration of a trade-off between a plurality of pieces of travel information. As the number of histories increases, performance may improve. However, operation speed may slow down and more storage capacity may be required, such that the number of histories may be set in consideration of the operation speed and storage capacity.

Figure 3:
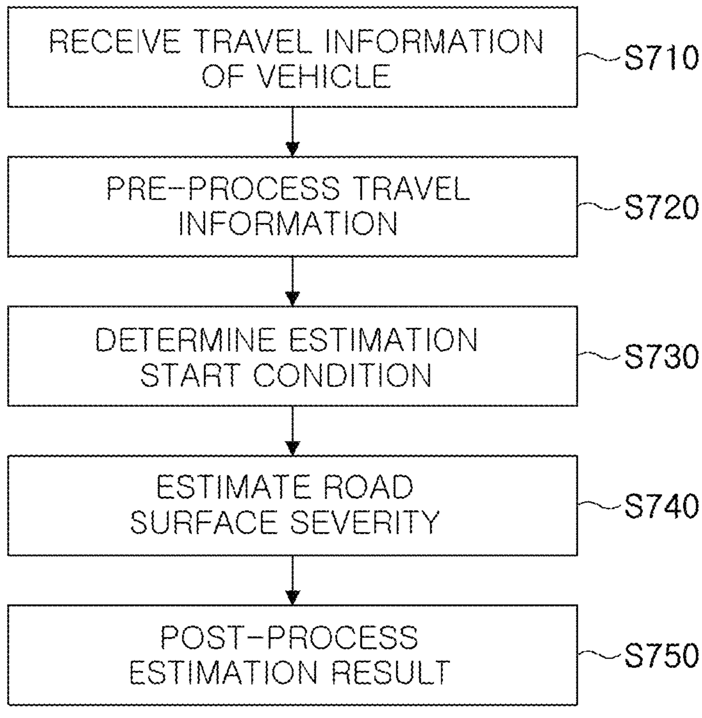
FIG. 3 is a flowchart illustrating a road surface condition estimation method according to an embodiment of the present disclosure.
Figure 4:
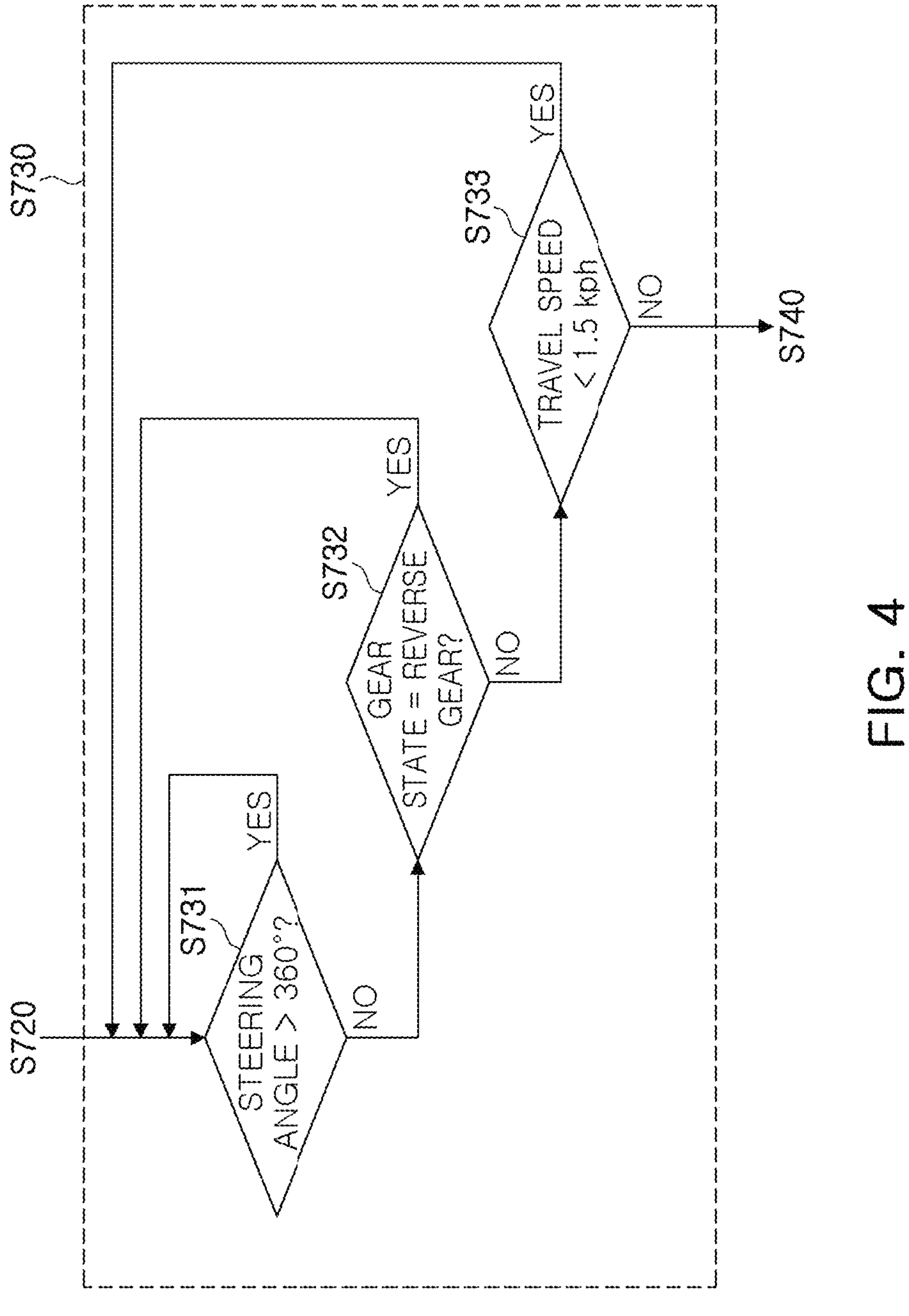
FIG. 4 is a detailed flowchart illustrating the determining estimation start condition of FIG. 3 according to an embodiment of the present disclosure.
Figure 5:
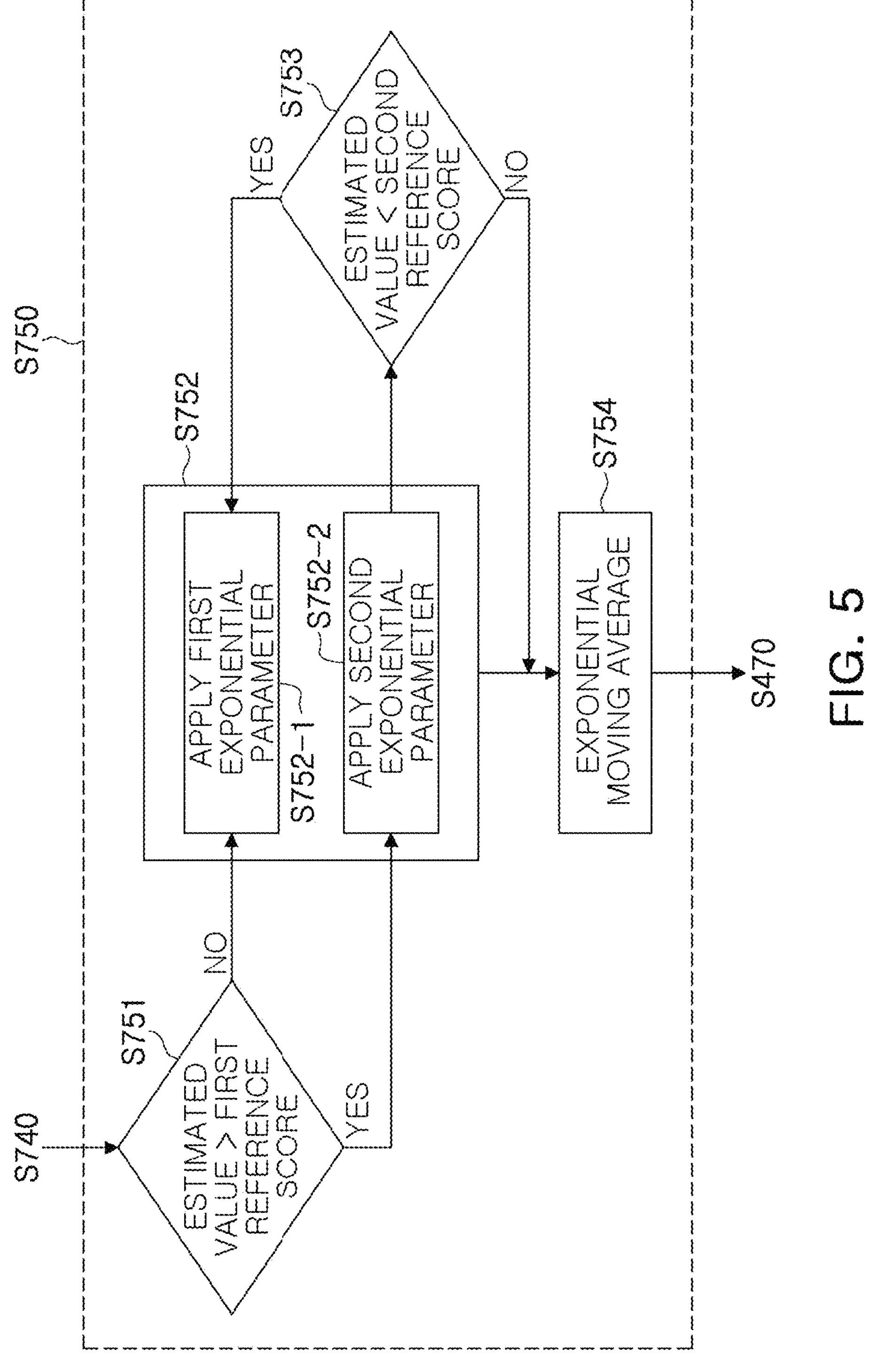
FIG. 5 is a flowchart illustrating a process of applying an exponential moving average of a post-processor according to an embodiment of the present disclosure.

FIG. 3 is a flowchart illustrating a road surface condition severity estimation method according to an embodiment of the present disclosure. FIG. 4 is a detailed flowchart illustrating the determining an estimation start condition in FIG. 3 according to an embodiment of the present disclosure. FIG. 5 is a flowchart illustrating a process of applying an exponential moving average of a post-processor 500 according to an embodiment of the present disclosure.

Referring to FIG. 3, a road surface condition severity estimation method (e.g., a road surface condition estimation method) according to an embodiment of the present disclosure may include receiving travel information of a travelling vehicle (S710). The travel information of the vehicle may include engine RPM, engine torque, longitudinal acceleration, lateral acceleration, yaw rate, wheel speed of each wheel, current gear state information, steering angle, a type of road surface on which the vehicle is travelling, and the like. In addition, the travel information of the vehicle may be received using the receiver 100 through a network provided in the vehicle.

The road surface condition severity estimation method according to an embodiment of the present disclosure may include pre-processing the received travel information (S720). The road surface condition severity estimation method according to an embodiment of the present disclosure may include pre-processing the received travel information using standardization. However, the present disclosure is not limited thereto, and various pre-processing methods, such as normalization, fast Fourier transform, and the like, may be applied to improve learning speed of the road surface condition severity estimation model 410 or improve learning performance.

The road surface condition severity estimation method according to an embodiment of the present disclosure may include determining an estimation start condition using the received travel information or the pre-processed travel information (S730). More specifically, the road surface severity estimator 300 may determine, based on the travel information of the vehicle, whether to start estimation of the road surface severity of a condition of a road surface on which the vehicle is travelling.

A method of determining the estimation start condition is described below in detail with reference to FIG. 4. The road surface condition severity estimation method according to an embodiment of the present disclosure may include determining, based on a steering angle, a current gear state, and a travel speed of the vehicle, whether to estimate road surface severity.

When a vehicle is executing a sharp turn, moving in reverse, or approaching a complete stop, road surface condition estimation may be meaningless or inaccurate estimation may be performed.

Accordingly, in the road surface condition severity estimation method according to an embodiment of the present disclosure, when the steering angle is greater than an angle setting value (e.g., 360 degrees), road surface condition severity estimation may not be performed (S731). A gear state may be verified when the steering angle is not greater than the angle setting value (e.g., 360 degrees), and road surface condition severity estimation may not be performed when the gear state is a reverse gear (S732). It may be verified whether the travel speed of the vehicle is less than a speed setting value (e.g., 1.5 kph), when the gear state is not a reverse gear. Additionally, when the travel speed of the vehicle is less than the speed setting value (e.g., 1.5 kph) (S733), the road surface condition severity estimation may not be performed. When the travel speed of the vehicle is greater than or equal to the speed setting value (e.g., 1.5 kph), road surface severity may be estimated.

In other words, when the steering angle is not greater than the angle setting value (e.g., 360 degrees), the gear is not a reverse gear, and the travel speed is greater than the speed setting value (e.g., 1.5 kph), road surface severity may be estimated. When at least one condition is not satisfied, road surface severity may not be estimated. The order of operations S731, S732, and S733 may be mutually changed, and operations S731, S732, and S733 may be connected in parallel rather than being connected sequentially, and may be determined simultaneously.

When the estimation start condition is satisfied, the road surface condition severity estimation method according to an embodiment of the present disclosure may include estimating road surface severity (S740). The road surface condition severity estimation method according to an embodiment of the present disclosure may include performing estimation using a deep trained road surface condition severity estimation model 410. The road surface condition severity estimation model 410 may include a deep learning network trained for each individual road surface.

The road surface condition severity estimation model 410 may estimate, based on the travel information, road surface severity. With respect to a road surface on which the vehicle is travelling, the road surface condition severity estimation model 410 may estimate, as a deep road surface, a road surface with a high probability of getting a vehicle stuck. Additionally, the road surface condition estimation model may estimate, as a shallow road surface, a road surface with a low probability of getting a vehicle stuck.

In addition, the road surface condition severity estimation method according to an embodiment of the present disclosure may include estimating road surface severity as a score within a preset range when using the road surface condition severity estimation model 410. For example, the road surface condition severity estimation method according to an embodiment of the present disclosure may include estimating, based on travel information, road surface severity as a score within a range of 0.0 to 1.0. A shallow road surface with a low probability of getting a vehicle stuck may be estimated as having a score closer to 0.0, and a deep road surface with a high probability of getting a vehicle stuck may be estimated as having a score closer to 1.0.

More specifically, when an estimated score is greater than a first reference score, a road surface on which the vehicle is travelling may be estimated as a deep road surface. When the estimated score is less than a second reference score, the road surface may be estimated as a shallow road surface. The first reference score may be a reference score for determining that the road surface on which the vehicle is travelling is a deep road surface. The second reference score may be a reference score for determining that the road surface on which the vehicle is travelling as a shallow road surface.

Differences between the first reference score and the second reference score and a median value within a preset range (e.g., 0.5 when a road surface severity score is estimated to be within a range of 0.0 to 1.0) may be different from each other. More specifically, the first reference score may be set to be closer to the median value, as compared to the second reference score. For example, the first reference score may be set to 0.6 and the second reference score to 0.3. In order to prevent the vehicle from being stuck vehicle, the road surface severity estimator 300 may set the first reference score (0.6) to be close to the median value (0.5), such that a deep road surface may be more stably and accurately measured.

The road surface condition estimation method according to an embodiment of the present disclosure may include post-processing an estimation result (S750).

As a post-processing method, an EMA and a method of using a previous estimated value rather than a newly estimated value under a preset condition may be applied.

First, with reference to FIG. 5, an estimated value transmitted from the road surface severity estimator 300 in S740 may be performed a post-processing method using an exponential moving average (EMA), a post-processing method using an exponential moving average (EMA) is described. The EMA may be a moving average assigning a greater weight and significance to most recent data. In the EMA, post-processing may be performed by applying an exponential parameter (a) to data estimated by the road surface severity estimator 300. A smaller exponential parameter may assign a greater weight to past data, thereby performing more stable and accurate estimation. Conversely, as a proportion of the past data increases, immediate response to current data may not be performed, and delay time may occur. Accordingly, more accurate estimation may be performed by adjusting a size of the exponential parameter depending on a circumstance.

Referring to FIG. 5, an estimated value transmitted from the road surface severity estimator 300 in S740 may be compared to a first reference score (e.g., 0.6) (S751). When the estimated value is greater than the first reference score, a second exponential parameter may be applied. When the estimated value is less than the first reference score, a first exponential parameter may be applied (S752-1 and S752-2). The first exponential parameter (e.g., 0.01) may be greater than the second exponential parameter (e.g., 0.001).

In other words, when road surface severity is determined as a deep road surface through EMA post-processing, the road surface severity estimator 300 may be configured to slowly determine road surface severity by applying the second exponential parameter. As a result, this prevents road surface severity, estimated by the road surface severity estimator 300, from frequently changing between a deep road surface and a shallow road surface, and thus assists in more accurately estimating a deep road surface.

In addition, even when the second exponential parameter is applied, the estimated value transmitted from the road surface severity estimator 300 may be compared to a second reference score (e.g., 0.2) (S753). When the estimated value is greater than the second reference score, the second exponential parameter may be maintained. When the estimated value is less than the second reference score, the first exponential parameter may be applied (S752-1 and S752-2). When the estimated value is lower than the second reference score, it may be considered that a road surface on which the vehicle is travelling is a shallow road surface. The shallow road surface may have a low probability of getting a vehicle stuck, and thus a relatively large exponential parameter value may be applied to reduce load on a system and improve estimated speed. In particular, when the road surface is determined as a deep road surface, road surface severity may be more slowly determined such that estimation of road surface severity does not change too frequently between a deep road surface and a shallow road surface to cause user confusion.

After the first exponential parameter or the second exponential parameter is determined, the estimated value transmitted from the road surface severity estimator 300 may be subjected to EMA post-processing using the determined exponential parameter (S754). The estimated value on which EMA post-processing is performed may be transmitted back to the road surface severity estimator 300, and the road surface severity estimator 300 may estimate, based on the estimated value on which post-processing is performed, the road surface severity.

In the road surface condition severity estimation method according to an embodiment of the present disclosure, when it is difficult to accurately estimate road surface severity, post-processing may be performed to maintain a previous estimated value of road surface severity without using the estimated data of the road surface severity estimator 300.

When it is difficult for the road surface severity estimator 300 to accurately estimate road surface severity, previous data estimated by the road surface severity estimator 300 may be maintained. For example, in a situation similar to that in which a vehicle is stopped (e.g., when a travel speed of the vehicle is 1.5 kph (kilometer per hour) or less, and an accelerator pedal stroke is 3% or less), the vehicle is turning (e.g., a steering angle is greater than 360 degrees), and the vehicle is reversing (e.g., the vehicle is in reverse gear), previous data estimated by the road surface severity estimator 300 may be maintained.

A road surface condition estimation apparatus according to an embodiment of the present disclosure may estimate road surface severity of an off-road road surface, using a road surface condition severity estimation model 410 using deep learning. In addition, results of estimating road surface severity may be filtered using pre-processing and post-processing algorithms, frequent changes in estimation depth may be prevented, and an estimation algorithm may be made more robust.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having ordinary skill in the art.

Examples of non-transitory computer-readable media include hardware devices that are specially configured to store and perform program instructions, such as read-only memory (ROM), random access memory (RAM), flash memory, and the like. Examples of program instructions include both machine code, such as produced by a compiler, and higher-level code that may be executed by the computer using an interpreter. The above-described devices may be configured to act as one or more software modules in order to perform the operations of the above-described embodiments, or vice versa.

While embodiments have been illustrated and described above, it should be apparent to those having ordinary skill in the art that modifications and variations could be made without departing from the scope of the present disclosure.

What is claimed is:

1. A road surface condition estimation apparatus, the apparatus comprising:

a receiver configured to acquire travel information using a network provided in a vehicle;

a storage unit configured to store a road surface condition estimation model;

a road surface severity estimator configured to estimate, based on the travel information, severity of a condition of a road surface on which the vehicle is travelling using the road surface condition estimation model; and a post-processor configured to perform post-processing on road surface severity information estimated by the road surface severity estimator, wherein the post-processor is further configured to:

apply a first exponential parameter value, when the road surface severity estimator estimates the road surface as a deep road surface, and apply a second exponential parameter value, when the road surface severity estimator estimates the road surface as a shallow road surface, wherein the road surface condition estimation apparatus is configured to output the post-processed road surface severity information as a reference for switching a travel mode of the vehicle, wherein switching the travel mode is based on a comparison of the post-processed road surface severity information to a preset value.

2. The apparatus of claim 1, wherein the travel information includes at least one of engine torque, engine speed, longitudinal acceleration, lateral acceleration, yaw rate, wheel speed, gear state, steering angle, and vehicle speed.

3. The apparatus of claim 1, wherein the road surface condition estimation model is trained using a deep learning network.

4. The apparatus of claim 3, wherein the road surface condition estimation model includes a first deep learning network and a second deep learning network, and the first deep learning network and the second deep learning network are trained based on data on different road surfaces.

5. The apparatus of claim 4, wherein the first deep learning network is trained to estimate severity of a sandy road surface, and the second deep learning network is trained to estimate severity of a muddy road surface.

6. The apparatus of claim 1, wherein the road surface severity estimator is configured to estimate the road surface severity, only when the travel information satisfies a preset estimation start condition.

7. The apparatus of claim 6, wherein the preset estimation start condition is determined based on at least one of a steering angle, a gear state, and a travel speed of the vehicle.

8. The apparatus of claim 6, wherein the preset estimation start condition includes at least a condition for a steering angle of the vehicle, and the road surface severity of a condition of a road surface on which the vehicle is travelling is estimated when the steering angle is 360 degrees or less.

9. The apparatus of claim 6, wherein the preset estimation start condition includes at least a condition for a gear state of the vehicle, and the road surface severity of a condition of a road surface on which the vehicle is travelling is estimated when the gear state is not a reverse gear.

10. The apparatus of claim 6, wherein the preset estimation start condition includes at least a condition for a travel speed of the vehicle, and the road surface severity of a condition of a road surf ace on which the vehicle is travelling is estimated when the travel speed of the vehicle is greater than or equal to a preset speed.

11. The apparatus of claim 1, wherein the road surface severity estimator is configured to estimate a result of estimating the road surface severity as a score within a preset range.

12. The apparatus of claim 11, wherein the score within the preset range has a range of 0.0 to 1.0.

13. The apparatus of claim 12, wherein the road surface severity estimator is configured to:

estimate the road surface as the deep road surface, when the estimated score is greater than a preset first reference score; and estimate the road surface as the shallow road surface, when the estimated score is less than a preset second reference score.

14. The apparatus of claim 13, wherein an average of the first reference score and the second reference score is less than 0.5.

15. The apparatus of claim 1, wherein the post-processor is further configured to perform post-processing using an exponential moving average (EMA).

16. The apparatus of claim 1, wherein the first exponential parameter value is set to be greater than the second exponential parameter value.

* * * * *